US011969791B2

(12) United States Patent
Effernelli et al.

(10) Patent No.: US 11,969,791 B2
(45) Date of Patent: Apr. 30, 2024

(54) ADDITIVE MANUFACTURING MACHINE WITH MOVABLE, CONTROLLED POWDER DISPENSING

(71) Applicant: AddUp, Cebazat (FR)

(72) Inventors: Albin Effernelli, Cebazat (FR); Cedric Carlavan, Cebazat (FR)

(73) Assignee: ADDUP, Cebazat (FR)

( * ) Notice: Subject to any disclaimer, the term of this patent is extended or adjusted under 35 U.S.C. 154(b) by 0 days.

(21) Appl. No.: 17/285,735

(22) PCT Filed: Oct. 14, 2019

(86) PCT No.: PCT/FR2019/052431
§ 371 (c)(1),
(2) Date: Apr. 15, 2021

(87) PCT Pub. No.: WO2020/089538
PCT Pub. Date: May 7, 2020

(65) Prior Publication Data
US 2022/0001453 A1    Jan. 6, 2022

(30) Foreign Application Priority Data
Oct. 16, 2018   (FR) ...................................... 1859554

(51) Int. Cl.
*B22F 12/52*        (2021.01)
*B22F 10/28*        (2021.01)
(Continued)

(52) U.S. Cl.
CPC .............. *B22F 12/41* (2021.01); *B22F 10/28* (2021.01); *B22F 10/30* (2021.01); *B22F 12/52* (2021.01); *B22F 12/53* (2021.01); *B22F 12/57* (2021.01); *B22F 12/60* (2021.01); *B22F 12/90* (2021.01); *B33Y 10/00* (2014.12); *B33Y 30/00* (2014.12); *B33Y 50/00* (2014.12); *B22F 12/67* (2021.01)

(58) Field of Classification Search
CPC ............ B33Y 50/00; B01F 2005/0438; B29C 45/2735
See application file for complete search history.

(56) References Cited

U.S. PATENT DOCUMENTS

| 5,647,931 A | 7/1997 | Retallick et al. |
| 11,292,059 B2 | 4/2022 | Nicaise et al. |
| (Continued) | | |

FOREIGN PATENT DOCUMENTS

| CN | 103738747 A | 4/2014 |
| JP | 4351218 B2 | 7/2009 |
| WO | 2017/108867 A1 | 6/2017 |

OTHER PUBLICATIONS

International Search Report dated Mar. 3, 2020, in corresponding PCT/FR2019/052431 (5 pages).

*Primary Examiner* — Farah Taufiq
(74) *Attorney, Agent, or Firm* — VENABLE LLP

(57) ABSTRACT

An additive manufacturing machine (10) comprises a working plane (18) comprising a working zone (20) allowing an overlay of different layers of powder to be received, and a powder dispensing device (32) comprising a powder intake (36) allowing powder to be delivered on top of the working plane. The powder dispensing device (32) comprises a tank (44) of powder mounted to move above the working plane (18) and that can be displaced to under the powder intake (36), the bottom part (45) of the tank (44) comprises a powder dispensing point (P1), and the powder dispensing device (32) comprises a control device (48) controlling the flow of powder via the powder dispensing point during a displacement of the tank. The tank (44) is mounted on a weighing sensor (68).

14 Claims, 2 Drawing Sheets

(51) Int. Cl.
  *B22F 10/30* (2021.01)
  *B22F 12/41* (2021.01)
  *B22F 12/53* (2021.01)
  *B22F 12/57* (2021.01)
  *B22F 12/60* (2021.01)
  *B22F 12/90* (2021.01)
  *B33Y 10/00* (2015.01)
  *B33Y 30/00* (2015.01)
  *B33Y 50/00* (2015.01)
  *B22F 12/67* (2021.01)

(56) References Cited

U.S. PATENT DOCUMENTS

| | | | |
|---|---|---|---|
| 2005/0280185 A1* | 12/2005 | Russell | B29C 64/165 |
| | | | 425/375 |
| 2013/0089642 A1* | 4/2013 | Lipson | B29C 64/106 |
| | | | 426/115 |
| 2015/0367446 A1* | 12/2015 | Buller | B23K 15/002 |
| | | | 219/74 |
| 2017/0057161 A1 | 3/2017 | Kuk et al. | |
| 2017/0252812 A1 | 9/2017 | Mykulowycz et al. | |
| 2017/0252813 A1 | 9/2017 | Myerberg et al. | |
| 2017/0252814 A1 | 9/2017 | Myerberg et al. | |
| 2017/0252815 A1 | 9/2017 | Fontana et al. | |
| 2017/0252816 A1 | 9/2017 | Shim et al. | |
| 2017/0252817 A1 | 9/2017 | Mykulowycz et al. | |
| 2017/0252818 A1 | 9/2017 | Gibson et al. | |
| 2017/0252819 A1 | 9/2017 | Gibson et al. | |
| 2017/0252820 A1 | 9/2017 | Myerberg et al. | |
| 2018/0043677 A1* | 2/2018 | Ochi | B29C 64/112 |
| 2019/0240777 A1* | 8/2019 | Kamigawara | B23K 26/1437 |
| 2020/0262147 A1* | 8/2020 | Mamrak | B33Y 40/00 |
| 2020/0269510 A1 | 8/2020 | Nicaise et al. | |
| 2021/0001544 A1 | 1/2021 | Carlavan et al. | |
| 2021/0206075 A1* | 7/2021 | Barribeau | B29C 64/153 |
| 2022/0212266 A1 | 7/2022 | Jeannot et al. | |

* cited by examiner

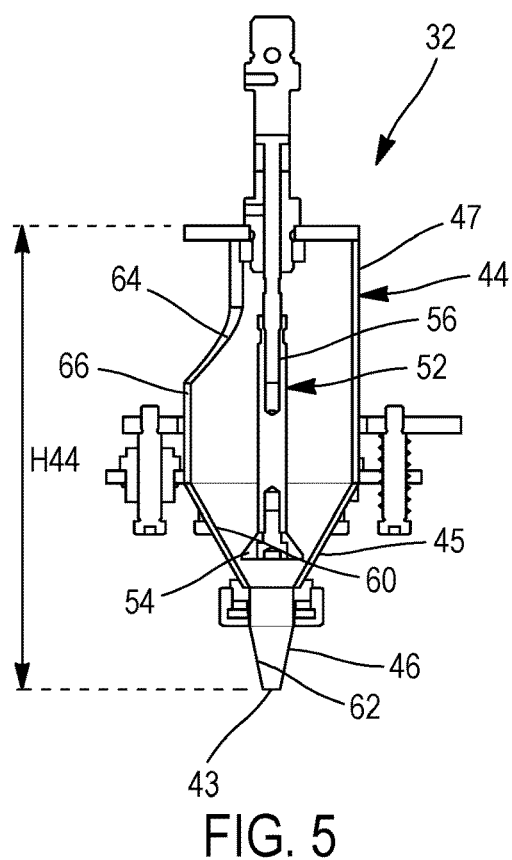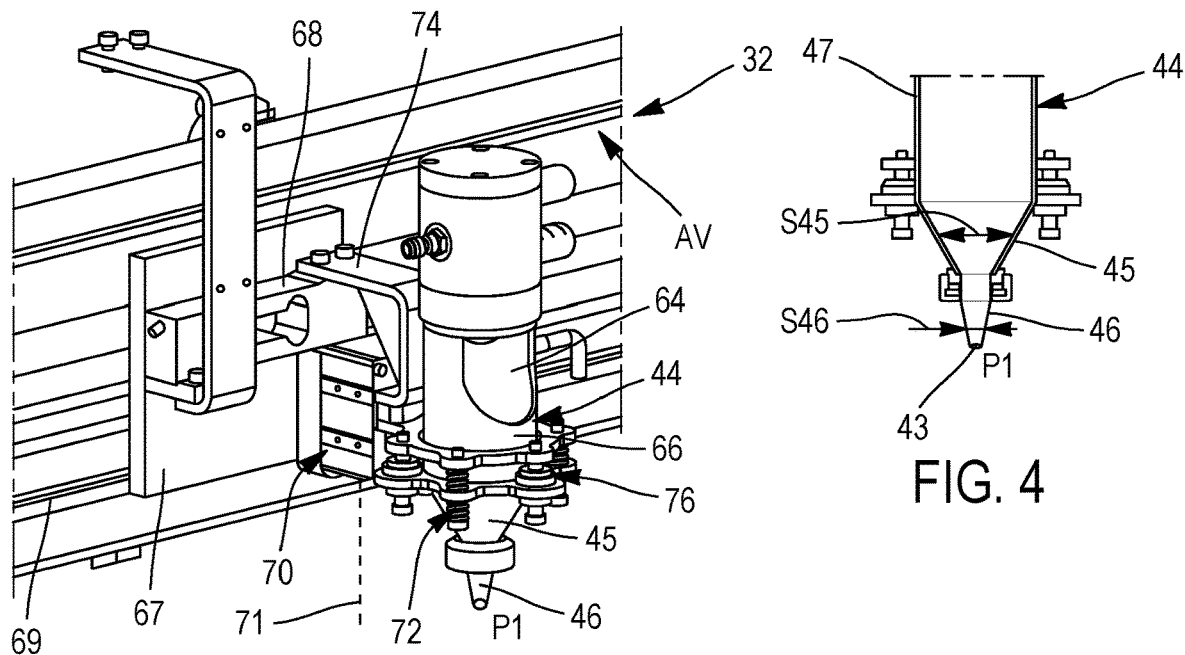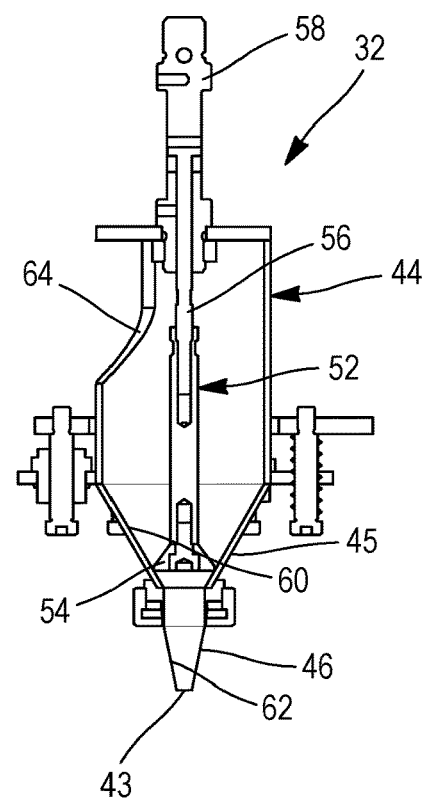

ADDITIVE MANUFACTURING MACHINE WITH MOVABLE, CONTROLLED POWDER DISPENSING

BACKGROUND

The invention relates to an additive manufacturing machine implementing a powder-based additive manufacturing method by fusion of the grains of this powder using one or more beams.

More specifically, the invention is situated in the field of additive manufacturing by powder bed deposition and it aims to optimize the deposition of a powder bead in front of the device allowing the powder to be spread over the working zone of a powder bed deposition additive manufacturing machine.

The U.S. Pat. No. 5,647,931 describes a powder bed deposition additive manufacturing machine wherein a powder dispensing container is used to spread powder over a working zone. To this end, the container can be displaced in translation above the working zone, and powder tanks used to supply the container are provided on either side of the working zone. In more detail, the container extends over the entire width of the working zone and it progressively delivers the powder by being displaced over this working zone by vibrating the container. The bottom part of the container is provided with blades that make it possible to smooth and compact the powder as it is deposited on the working zone. Thus, the powder dispensing container also serves as powder spreading device.

According to a first drawback, the dispensing container described in this U.S. Pat. No. 5,647,931 allows neither depositing a powder bead of variable profile and length within the width of the working zone nor depositing powder discontinuously within the width of the working zone. Consequently, this dispensing container does not make it possible to adjust the quantity of powder deposited to the geometry of the part or parts manufactured or to the form of the working zone. For example, with the dispensing container described in this U.S. Pat. No. 5,647,931, if the working zone has a circular outline, a significant quantity of powder will be unnecessarily deposited on either side of the central part of the working zone.

According to another drawback, the U.S. Pat. No. 5,647,931 does not provide means that make it possible to adapt the powder dispensing container to different additive manufacturing powders having different particle sizes and/or having different flowabilities.

The application WO2017108867 describes a powder bed deposition additive manufacturing machine comprising a device that makes it possible to deposit a powder bead of variable profile in front of the device allowing the powder to be spread over a working zone.

In more detail, the machine described in the application WO2017108867 comprises at least one injector for directly injecting powder onto a working surface of the machine, this injector being movable with respect to the working surface in at least one transverse horizontal direction. Furthermore, this machine also comprises a system for regulating the quantity of powder dispensed by the injector.

According to this application WO2017108867, the regulation of the quantity of powder dispensed by the injector can be performed by regulating the height of the injector with respect to the working surface. To this end, the injector is mounted to be movable with respect to the working surface in a vertical direction, and the regulation system allows the vertical position of the injector to be set with respect to the working surface.

According to one drawback, the regulation system described in the application WO2017108867 does not allow a discontinuous deposition of powder on the working surface. Furthermore, with the regulation system described in the application WO2017108867, the injector cannot be displaced without depositing powder on the working surface, which does not make it possible to adapt the quantity of powder deposited to the form of the plate.

According to other drawbacks, the injector described in this application WO2017108867 does not make it possible to know either the exact quantity of powder deposited, or the profile of the powder bead deposited in front of the powder spreading device.

The patent JP4351218 describes an additive manufacturing machine comprising a powder dispensing device that allows a powder bead of variable or discontinuous profile to be deposited within the width of the working zone, and that can be adapted to the dispensing of powders with different particle sizes and/or different flowabilities.

To this end, the powder dispensing device described in the patent JP4351218 takes the form of a tank that can be translated within the length of the powder spreading device. Also, this movable tank can be equipped with a vibrator and/or a blocking system preventing the dispensing of powder.

However, the powder dispensing device described in the patent JP4351218 does not make it possible to know either the exact quantity of powder deposited, or the profile of the powder bead deposited in front of the powder spreading device, while such information makes it possible to guarantee the good quality of the parts manufactured.

The document CN103738747 describes a powder dispensing device for an additive manufacturing machine. This powder dispensing device takes the form of a movable tank equipped with blocking means and two sensors for measuring high and low powder levels in the tank.

The level sensors described in the document CN103738747 give information relating to the maximum or minimum quantity of powder present inside the movable tank. However, these sensors do not make it possible to measure accurately and in real time the exact quantity of powder deposited in front of the powder spreading device. Therefore, these sensors do not make it possible to accurately know the profile of the powder bead deposited in front of the powder spreading device.

SUMMARY

The aim of the present invention is to provide a powder dispensing device capable of depositing a powder bead of variable or discontinuous profile in front of the powder spreading device and of collecting information relating to the quantity of powder deposited for the production of each layer of powder.

To this end, the subject of the invention is a powder bed deposition additive manufacturing machine, this additive manufacturing machine comprising a working plane comprising a working zone allowing an overlay of different layers of powder to be received, a powder dispensing device, and a beam emitted by a source and allowing a layer of additive manufacturing powder spread over the working zone to be selectively fused. The powder dispensing device comprises a powder intake allowing the powder to be delivered on top of the working zone, a tank movably mounted above the working plane and that can be displaced to under the powder intake so as to be filled with powder. The bottom part of the tank comprising a powder dispensing point, the powder dispensing device comprises a control device controlling the flow of powder via the powder dispensing point during a displacement of the tank.

According to the invention, the tank of the powder dispensing device is mounted on a weighing sensor.

By virtue of the powder dispensing point and the mobility of the tank, the dispensing device allows a localized distribution of powder. Furthermore, the association of the movable tank and of its powder dispensing point with the control device controlling the flow of powder makes it possible to envisage, on the one hand, the deposition of a powder bead of variable profile, and, on the other hand, the deposition of a discontinuous powder bead. Finally, the weighing sensor on which the tank is mounted makes it possible to know accurately and in real time the quantity of powder deposited in front of the spreading device and used for the production of each layer of powder.

The invention also provides for:
the weighing sensor to be a strain measurement gauge weighing sensor,
a nozzle comprising the powder dispensing point to be removably mounted under the bottom part of the tank, the aperture forming the powder dispensing point being situated at the lowest end of the nozzle,
the nozzle having a hollow internal section, this hollow internal section to reduce progressively towards the powder dispensing point,
the control device controlling the flow of powder to comprise a vibrator fixed to the tank,
the control device controlling the flow of powder to comprise a movable shutter, the shutter making it possible to prevent the powder from flowing through the powder dispensing point when this shutter is in a closed position, and this shutter allowing the powder to flow through the powder dispensing point when this shutter is in an open position, the shutter to take the form of a flap valve mounted at the end of a rod mounted to move by translation inside the tank,
when the shutter is in an open position, the flap valve to be in a high position and not to be in contact with the bottom part of the tank, and, when the shutter is in a low position, the flap valve to be in a low position and to be in contact with the bottom part of the tank,
the upper part of the tank to comprise a supply aperture allowing the tank to be supplied with powder from the powder intake, and the upper part of the tank comprising a lateral wall, the supply aperture to be provided in this lateral wall,
the spreading device taking the form of a scraper or of a roller mounted on a carriage, the tank to be mounted to be moved by translation on the carriage of the powder spreading device,
the tank to be able to be displaced by translation on the front face or on the rear face of the carriage,
the powder dispensing device to comprise a contactless measurement device for measuring the profile of the powder deposited on the working plane or on the working zone,
the powder dispensing device to comprise several powder intakes,
the powder dispensing device to comprise several powder tanks mounted to move above the working plane and to be able to be displaced to under a powder intake so as to be filled with powder.

The invention relates also to an additive manufacturing method implemented with the machine according to the invention.

According to the invention, this method provides for:
the displacements of a tank of the powder dispensing device to be servocontrolled on the measurements performed by the weighing sensor on which this tank is mounted,
the speeds of the displacements of a tank of the powder dispensing device to be servocontrolled on the measurements performed by the weighing sensor on which this tank is mounted, and
the operating of the control device controlling the flow of powder from a tank of the powder dispensing device to be servocontrolled on the measurements performed by the weighing sensor on which this tank is mounted.

BRIEF DESCRIPTION OF THE DRAWINGS

Other features and advantages of the invention will become apparent from the following description. This description, given as an example and in a nonlimiting manner, refers to the attached drawings in which:

FIG. 3 is a perspective view of a powder dispensing device of an additive manufacturing machine according to the invention, and FIG. 4 is a detail view in cross section of the tank of a powder dispensing device of an additive manufacturing machine according to the invention, FIG. 5 is a view in cross section of the tank of a powder dispensing device of an additive manufacturing machine according to the invention, the tank being equipped with a shutter in open position, and FIG. 6 is a view in cross section of the tank of a powder dispensing device of an additive manufacturing machine according to the invention, the tank being equipped with a shutter in closed position.

DETAILED DESCRIPTION

The invention relates to a powder bed deposition additive manufacturing machine. Additive manufacturing by powder bed deposition is an additive manufacturing method in which one or more parts are manufactured by the selective fusing of different layers of additive manufacturing powder overlaid on one another. The fusion can be total or partial (sintering). The fusion is said to be selective because only zones of the layers of powder corresponding to sections of parts to be manufactured are fused.

The machine according to the invention is more particularly intended for the manufacturing of metal parts. Consequently, the means described hereinbelow have been particularly designed to allow the dispensing and the deposition of metallic additive manufacturing powder. A metallic additive manufacturing powder comprises at least one metal in the form of powder. However, a metallic additive manufacturing powder generally comprises several metals in the form of powder, and, possibly, other chemical elements or compounds.

For the implementation of additive manufacturing by powder bed deposition, the first layer of powder is deposited on a support such as a plate, then sintered or fused selectively using one or more beams in a first horizontal section of the part or parts to be manufactured. Then, a second layer of powder is deposited on the first layer of powder which has just been fused or sintered, and this second layer of powder is sintered or fused selectively in its turn, and so on until the last layer of powder required for the manufacturing of the last horizontal section of the part or parts to be manufactured.

Figure 1:
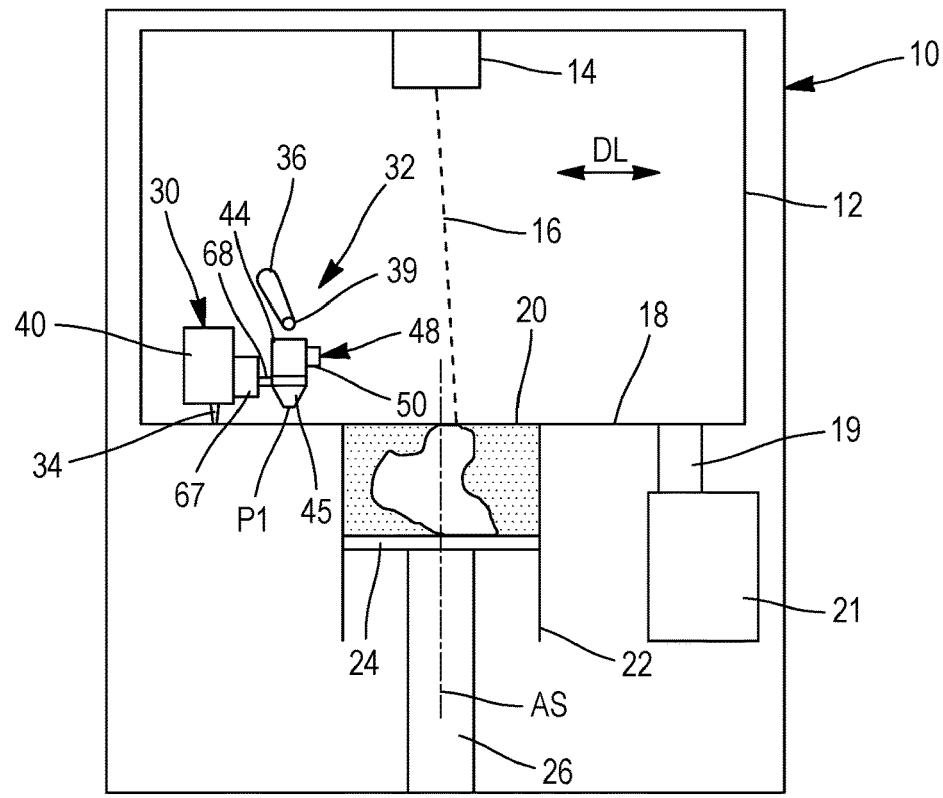
FIG. 1 is a schematic front view of an additive manufacturing machine according to the invention.

As FIG. 1 illustrates and in order to allow additive manufacturing of parts by powder bed deposition, the additive manufacturing machine 10 according to the invention comprises a working plane 18 comprising a working zone 20 allowing an overlay of different layers of powder to be received, and at least one beam 16 emitted by at least one source 14, this beam 16 allowing a layer of additive manufacturing powder spread over the working zone 20 to be selectively fused.

A beam 16 is preferably a laser beam emitted by a laser source. As a variant, several beams 16 can be emitted by several laser sources such as, for example, laser diodes. Still as a variant, a beam 16 can be an electron beam emitted by an electron gun. One or more laser beams can also be associated with one or more electron beams. In order to allow a selective fusion of a layer of powder, that is to say according to predetermined patterns and trajectories, a source 14 is associated with means for displacing and controlling the beam or beams 16. For example, mirrors, optical lenses and/or mechanical actuators make it possible to displace and modify one or more laser beams, and electromagnetic coils make it possible to displace and control an electron beam.

The working plane 18 is horizontal. A working zone 20 is defined by a manufacturing sleeve 22 and a manufacturing plate 24. The sleeve 22 extends vertically under the working plane 18 and it emerges in the working plane 18. The manufacturing plate 24 slides vertically inside the manufacturing sleeve 22 under the effect of an actuator 26 such as a power cylinder. As illustrated in FIG. 1, the working plane 18 and the sleeve 22 are fixedly mounted, and the manufacturing plate 24 is displaced by vertical translation in the sleeve 22 under the effect of the power cylinder 26. As a variant, the manufacturing plate 24 is fixedly mounted, and one or more power cylinders 26 make it possible to displace the working plane 18, and possibly the sleeve 22, by vertical translation.

In order to produce the different layers of powder required for the additive manufacturing of the part or parts to be manufactured, the additive manufacturing machine comprises a powder dispensing device 32 that allows at least one bead of powder to be deposited on the working plane 18 and a powder spreading device 30 that allows a bead of powder deposited by the dispensing device to be spread over the working zone 20.

Figure 2:
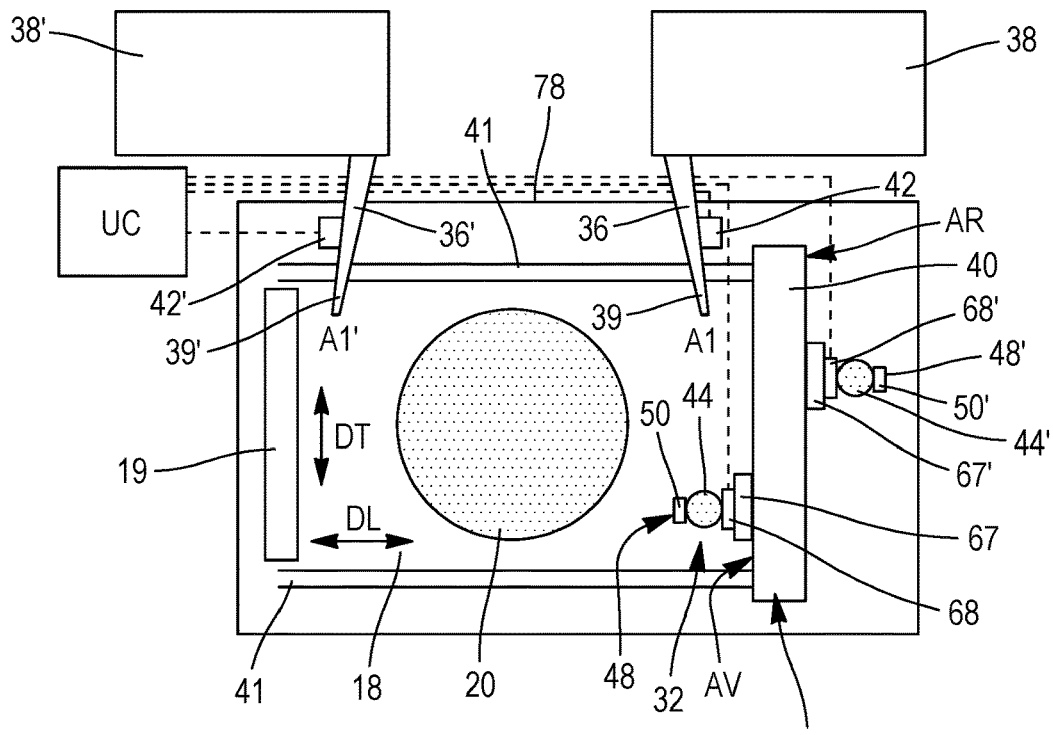
FIG. 2 is a schematic top view of an additive manufacturing machine according to the invention.

The spreading device 30 takes the form of a scraper 34 or of a roller mounted on a carriage 40. This carriage 40 is mounted to move by translation in a longitudinal horizontal direction DL above the working plane 18 and at least one working zone 20. The longitudinal horizontal direction DL is parallel to the working plane 18 and it extends within the length of the working plane 18, that is to say within its greatest dimension in a horizontal plane. As illustrated by FIG. 2, the carriage 40 is, for example, mounted on rails 41 via rollers or skids. In order to be driven by translation in the longitudinal horizontal direction DL, the carriage 40 preferably comprises an embedded motorization. Alternatively, the carriage 40 can be set in motion by a motor that is not embedded and that is fixedly mounted in the machine 10, via a movement transmission system such as pulleys and a belt.

Since the powder is deposited in excess in front of the spreading device 30, at least one groove 19 is provided in the working plane 18 to recover the excess powder. This groove 19 is linked to a powder recovery tank 21 provided under the working plane 18.

To manufacture parts of revolution or improve the mechanical strength of the manufacturing sleeve 22 in a vacuum with a view to additive manufacturing by electron beam, the manufacturing sleeve 22 can be cylindrical. In this case, the working zone 20 is circular, as FIG. 2 illustrates.

For its supply of additive manufacturing powder, the powder dispensing device 32 comprises at least one powder intake 36 allowing powder to be delivered on top of the working plane 18.

A powder intake 36 takes the form of a chute or of a tube linked to a main tank 38 of powder. A powder intake 36 is preferably fixedly mounted above the working plane 18. As a variant, a powder intake 36 can also be mounted to move above the working plane 18. The free end 39 of the powder intake 36 forms a powder supply point A1 above the working plane 18. Advantageously, a powder intake 36 is inclined with respect to a horizontal plane in order for the powder to flow by gravity in the powder intake 36. In addition, a powder intake 36 can be equipped with a device 42 that makes it possible to control the flow rate of powder delivered by the supply point A1. This flow rate control device 42 can be a vibrating device and/or a flap valve device.

According to the invention, the powder dispensing device 32 comprises at least one tank 44 of powder mounted to move above the working plane 18 and that can be displaced to under the powder intake 36 so as to be filled with powder. More specifically, a tank 44 can be positioned under the powder supply point A1 formed by the free end 39 of a powder intake 36.

For powder to be dispensed by gravity, the bottom part 45 of a tank 44 comprises a powder dispensing point P1. This powder dispensing point P1 takes the form of an aperture 43 provided in the bottom part 45 of the tank 44. This aperture 43 is situated at the lowest end of the tank 44, as FIG. 4 illustrates.

A tank 44 contains a quantity of powder dependent on the surface area of the working zone. Ideally, the quantity of powder contained in a tank 44 is sufficient to produce at least one layer of powder on the working zone 20. Provision can be made to resupply a tank 44 with powder between each layering of powder. To this end, the tank 44 comes to be positioned between each layering of powder under the free end 39 of the powder intake 36. Provision can also be made for the tank 44 to contain a quantity of powder sufficient to produce several layers of powder and even all the layers of powder necessary to the manufacturing of the part or parts to be manufactured.

In order to allow the deposition of a bead of powder of variable or discontinuous profile, the powder dispensing device 32 comprises a control device 48 controlling the flow of powder via the powder dispensing point P1 during a displacement of the tank.

According to the invention, this control device 48 controlling the flow of powder can comprise a vibrator 50 fixed to the tank 44. The vibrator 50 is preferably of pneumatic type. The vibrator 50 moves with the tank 44. The use of vibrations makes it possible to control the flow rate of powder delivered via the powder dispensing point P1 because the grains of certain additive manufacturing powders tend to form clumps in the container which contains them. The appearance of these clumps is due to the small particle size, of the order of a few tens of micrometres, of the additive manufacturing powders, notably metallic. Thus, when no vibration is applied to the tank 44, the powder that it contains forms a clump upstream of the powder dispensing point P1 and the powder does not flow through the powder dispensing point P1. In order for the powder to flow through the powder dispensing point P1, vibrations are applied to the tank 44. These vibrations make it possible to break up the clumps of powder which can form in the tank 44. The vibrations thus promote the flow of powder via the powder dispensing point P1.

In order to promote the appearance of clumps of powder in the tank 44 and as FIG. 4 illustrates, the hollow internal section S45 of the bottom part 45 of the tank 44 reduces progressively towards the powder dispensing point P1. Preferably, the hollow internal section S45 of the bottom part 45 of the tank 44 has a tapered form.

The upper part 47 of the tank, situated above the bottom part 45, is preferably cylindrical.

Advantageously and as FIG. 3 illustrates, a nozzle 46 comprising the powder dispensing point P1 is removably mounted, preferably using a screw pitch, under the bottom part 45 of the tank 44. Thus, different nozzles 46 can be mounted under the tank 44 in order to adapt the powder dispensing device 32 to different additive manufacturing powders that have different particle sizes. For example, the lower the flowability of the powder to be dispensed, the greater the internal section S46 of the nozzle mounted under the tank. When the tank is equipped with a nozzle 46, this nozzle forms part of the bottom part 45 of the tank, and the aperture 43 forming the powder dispensing point P1 is situated at the lowest end of the nozzle 46.

In order to promote the appearance of clumps of powder in the nozzle and as FIG. 4 illustrates, the hollow internal section S46 of the nozzle 46 reduces progressively towards the powder dispensing point P1. Preferably, the hollow internal section S46 of the nozzle 46 has a tapered form.

There are certain additive manufacturing powders which have a significant flowability, that is to say which flow easily, and which do not tend to form clumps in the container which contains them. To stop the flow of such powders, the control device 48 controlling the flow of powder can comprise a movable shutter 52. As FIG. 6 illustrates, this shutter 52 makes it possible to prevent the powder from flowing through the powder dispensing point P1, that is to say through the aperture 43, when this shutter is in a closed position. And, as FIG. 5 illustrates, this shutter 52 allows the powder to flow through the powder dispensing point P1, that is to say through the aperture 43, when this shutter is in an open position.

The shutter 52 takes the form of a flap valve 54 mounted at the end of a rod 56 which can move by translation. The flap valve 54 is conical and mounted head-down, that is to say with its greatest section below its smallest section. The rod is mounted to move by translation inside the tank 44. The rod extends within the height H44 of the tank. The rod 56 is moved by translation in a vertical direction. The rod 56 is preferably set in motion by a pneumatic actuator 58 of dual-acting cylinder type.

When the shutter 52 is in an open position, the flap valve 54 is in a high position and it is not in contact with the internal wall 60 of the bottom part 45 of the tank, or with the internal wall 62 of the nozzle 46 when a nozzle is mounted under the tank. When the shutter 52 is in a closed position, the flap valve 54 is in a low position and it is in contact with the internal wall 60 of the bottom part of the tank, or with the internal wall 62 of the nozzle when a nozzle is mounted under the tank.

By modifying the high position of the flap valve 54 corresponding to the open position of the flap valve 54, it is possible to best adapt the operation of the control device 48 controlling the flow of powder to the particle size and to the flowability of the powder to be dispensed.

In order to make the powder dispensing device 32 compatible with numerous powders of different particle sizes and of different flowabilities, the tank 44 can be equipped with a vibrator 50 and with a movable shutter 52.

As FIGS. 3, 5 and 6 show, the tank 44 comprises a supply aperture 64. This supply aperture 64 allows the tank to be supplied with powder from the powder intake 36. The upper part 47 of the tank comprising a lateral wall 66, the supply aperture 64 is provided in this lateral wall 66 of the tank 44. For the tank to be supplied with powder, the tank is displaced to under the powder intake 36, so that the free end 39 of the powder intake 36 penetrates into the tank 44 via the supply aperture 64.

In order to be movable above the working plane 18, to be able to be displaced to under the powder intake 36 and to be able to deposit a bead of powder in front of the powder spreading device 30, the tank 44 is mounted to move by translation above the working plane 18 and in a transverse direction DT at right angles to the axis of overlay AS of the layers of powder on the working zone 20. The axis of overlay of the layers AS is the axis according to which the layers are overlaid on one another. This axis of overlay AS is at right angles to the plane of each layer of powder. Since the plane of each layer of powder and the working plane 18 are horizontal planes, the axis of overlay AS is vertical. Preferably, the scraper 34 or the roller of the powder spreading device 30 extend in the transverse direction DT in which the tank can be translated.

In order to be able to deliver powder at any point of the working zone 20 or at any point of the working plane 18 situated around the working zone, the tank 44 is also mounted to move by translation in a longitudinal direction DL at right angles to the axis of overlay AS of the layers of powder on the working zone 20 and at right angles to the transverse direction DT. Preferably, the longitudinal direction DL, in which the carriage 40 of the powder spreading device 30 is displaced, is also the longitudinal direction DL in which the tank can be translated.

By being movable both in the transverse direction DT and in the longitudinal direction DL, the tank 44 allows localized depositions of powder at any point of the working zone 20, which makes it possible to limit the quantity of powder used, notably when it is an additive manufacturing powder containing a precious metal. That also allows the powder to be deposited as close as possible to the working zone 20.

The mounting of the tank 44 on the carriage 40 of the powder spreading device 30 makes it possible to obtain the translational mobility of the tank 44 in the longitudinal direction DL, this carriage being displaced in this longitudinal direction DL.

To obtain the displacement of the tank in the transverse direction DT, the tank 44 is mounted to move by translation in the transverse direction DT on the carriage 40 of the powder spreading device 30. To this end, the carriage 40 comprises a shuttle 67 and means 69 for translationally guiding and driving the shuttle in the transverse direction DT. The tank is mounted on the shuttle 67. The means 69 for translationally guiding and driving the shuttle 67 with respect to the carriage 40 comprise, for example, a rail and a belt linked to the shuttle and driven by a motor via a pulley, the shuttle being mounted on the rail via rotary rollers.

Advantageously, and for example to avoid unnecessary round trips of the carriage 40 on either side of the working zone, the tank 44 can be displaced by translation in the transverse direction DT on the front face AV and on the rear face AR of the carriage 40. To this end, the translational guiding and driving means 69 are provided on the front face AV and on the rear face AR of the carriage 40. Thus, whatever the position of the carriage 40 with respect to the working zone, the tank 44 always allows a powder bead to be deposited between the scraper 34 or the roller mounted on the carriage 40 and the working zone 20.

By varying the speed of displacement of the tank 44 in the transverse direction DT, it is possible to deposit a bead of powder of variable profile in the transverse direction DT on the working plane 18. By varying the speed of displacement of the tank 44 in the longitudinal direction DL, it is possible to deposit a bead of powder of variable profile in the longitudinal direction DL on the working plane. For example, it may be useful to increase the quantity of powder deposited in front of the spreading device 30 facing the fused zones of the preceding layer of powder because these fused zones are situated slightly set back from the zones of this layer of powder which are not fused.

By displacing the flap valve 54 of the movable shutter 52 and/or by applying or not applying vibrations using the vibrator 50 when the tank is displaced in the transverse direction DT and/or in the longitudinal direction DL, it is possible to deposit a bead of powder of discontinuous profile in the transverse direction DT and/or in the longitudinal direction DL on the working plane. For example, it may be useful to deposit beads of reduced length and in a localized manner at the end of manufacturing in the case where the part or parts do not occupy all the surface of the working zone at the end of manufacturing.

In order to know the exact quantity of powder deposited via the powder dispensing point P1 and as FIG. 3 illustrates, the tank 44 is mounted on a weighing sensor 68. The weighing sensor 68 makes it possible to measure the weight of the tank and of the powder that it contains. When the powder is delivered via the powder dispensing point P1, the weighing sensor 68 makes it possible to measure the reduction of the weight of the powder present in the tank, and therefore the quantity of powder delivered. Possibly, the weighing sensor can also be used to measure the variations of flow rate of powder by measuring the variation of the weight of powder present in the tank 44 over time. Advantageously, the weighing sensor 68 makes it possible to detect a stoppage of the flow of powder or an abnormal reduction of the flow rate of powder, for example due to the formation of a powder plug in the tank. The weighing sensor 68 makes it possible to detect the residues of powder which can build up in the tank 44 over the manufacturing cycles. The weighing sensor 68 makes it possible to avoid an excessive filling of the tank 44 if powder is still present in the tank when the latter is present under the powder intake 36.

Advantageously, the operation of the device 42 for controlling the flow rate of a powder intake 36 is driven using measurements performed by the weighing sensor 68. To this end, the machine comprises a control unit UC linked to the weighing sensor 68 and to the flow rate control device 42. The displacements of the tank 44, and therefore of the carriage 40, are also driven on the basis of the measurements performed by the weighing sensor 68. By making it possible to drive both the supply of powder and the dispensing of powder, the weighing sensor 68 makes it possible to simplify the operation of the powder dispensing device 32.

The weighing sensor 68 is, for example, a strain measurement gauge weighing sensor. This weighing sensor 68 takes the form, for example, of a flexurally mounted arm equipped with a strain measurement gauge.

In the case where the tank 44 is mounted on the carriage 40 of the powder spreading device 30 via the shuttle 67, the weighing sensor 68 links the tank 44 to the shuttle 67. Advantageously, the vibrations of the vibrator 50 do not disrupt the measurements performed by the weighing sensor 68.

In order to know the profile of the bead of powder deposited in front of the powder spreading device, notably when a bead of powder of variable profile is deposited in front of the powder spreading device, the powder dispensing device 32 comprises a device 70 for contactlessly measuring the profile of the powder deposited on the working plane 18 or on the working zone 20. This contactless measurement device 70 preferably takes the form of a laser profilometer using a laser beam 71 to measure the profile of the bead of powder deposited in front of the spreading device 30. This contactless measurement device 70 is, for example, used occasionally to calibrate the powder dispensing device 32.

In the case where the tank 44 is mounted on the carriage 40 of the powder spreading device 30 via a shuttle 67, this contactless measurement device 70 is mounted on the shuttle 67.

In order to avoid the propagation of the vibrations emitted by the vibrator 50 to the other components of the dispensing device 32 and more generally to the other components of the machine, the tank 44 is mounted on suspensions 72.

In the case where the tank 44 is mounted on a weighing sensor 68, a support 74 is mounted on the weighing sensor 68, and the suspensions 72 link the tank 44 to the support 74.

In parallel with the suspensions 72, guiding elements 76 link the tank 44 to the support 74.

Preferably, the components of the powder dispensing device 32 which are brought into contact with grains of powder are produced in a rust-proof material, such as a stainless steel for example.

Ideally, the powder dispensing point P1 is situated between 5 and 10 millimetres above the top of the bead of powder deposited. This dispensing height makes it possible to limit powder sprays.

In the case where the additive manufacturing machine 10 comprises a powder receiving surface that is movable and that can be displaced in proximity to a working zone 20, the powder dispensing device 32 according to the invention and its tank 44 can be used to deposit powder on this movable receiving surface.

Preferably, the additive manufacturing machine 10 comprises a manufacturing enclosure 12 which is a closed enclosure. In this case, the working plane 18, the working zone 20, the powder spreading device 30 and the powder dispensing device 32 according to the invention are situated in this manufacturing enclosure 12. The main tank 38 of powder is situated outside the manufacturing enclosure 12 and the powder intake 36 passes through a wall 78 of the manufacturing enclosure. The tank 44 is displaced within this manufacturing enclosure 12.

During a manufacturing cycle, the manufacturing enclosure 12 can be filled with an inert gas such as nitrogen to avoid oxidizing the additive manufacturing powder and/or to avoid the risks of explosion. The manufacturing enclosure 12 can be kept slightly pressurized to avoid the entry of oxygen, or kept in a vacuum when an electron beam is used inside the enclosure to sinter or fuse the powder.

In order to allow the manufacturing of one and the same part with different materials and therefore from different additive manufacturing powders, the powder dispensing device 32 can comprise several powder intakes 36,36', as FIG. 2 shows. The different powder intakes 36,36' can deliver different powders above the working plane 18 for the manufacturing of one and the same part with different materials, or else one and the same powder on either side of the working zone in order to improve the productivity of the machine. The tank 44 can be displaced to under the different powder intakes 36,36'. The different powder intakes 36,36' are linked to different main tanks 38,38', containing different powders or an identical powder. Each powder intake 36,36' is preferably fixedly mounted above the working plane 18. As a variant, the powder intakes 36,36' can also be mounted to move above the working plane 18. The free ends 39,39' of the powder intakes 36,36' form powder supply points A1,A1' above the working plane 18. Advantageously, the powder intakes 36,36' are inclined with respect to a horizontal plane in order for the powder to flow by gravity in the powder intakes 36,36'. In addition, each powder intake 36,36' can be equipped with a device 42,42' making it possible to control the flow rate of powder delivered by its supply point A1,A1'. A flow rate control device 42,42' is linked to the control unit UC. A flow rate control device 42,42' can be a vibrating device and/or a flap valve device.

The different powder intakes are, for example, arranged on either side of the working zone 20, as FIG. 2 illustrates. In this case, it is advantageous for the tank 44 to be able to be displaced by translation in the transverse direction DT on the front face AV and on the rear face AR of the carriage 40 in order to avoid unnecessary round trips of the carriage 40 between the powder intakes situated on either side of the working zone.

For the manufacturing of one and the same part with different materials, or more simply to reduce the cycle times when the powder dispensing device 32 comprises only one powder intake 36, the powder dispensing device 32 can comprise several tanks 44,44' of powder mounted to move above the working plane 18 and that can be displaced to under one or more powder intakes 36,36' so as to be filled with powder, as FIG. 2 shows. In this case, each tank 44,44' comprises a powder dispensing point, and each tank 44,44' is equipped with a control device 48,48' controlling the flow of powder via the powder dispensing point during a displacement of the tank. In addition, each tank 44,44' is mounted on a weighing sensor 68,68' and on a shuttle 67,67'. The weighing sensors 68,68' of the different tanks 44,44' are linked to the control unit UC.

The invention relates also to an additive manufacturing method implemented with a machine 10 as has just been described. According to the invention, the method provides for the displacements of a tank 44,44' of the powder dispensing device 32 to be servocontrolled on the measurements performed by the weighing sensor 68,68' on which this tank is mounted.

More specifically, the speeds of the displacements of a tank 44,44' of the powder dispensing device 32 are servocontrolled on the measurements performed by the weighing sensors 68,68' on which this tank is mounted, for example to deposit a bead of powder of variable or discontinuous profile on the working plane 18 or on a working zone 20 of the machine.

In parallel, the operation of the control device 48,48' controlling the flow of powder from a tank 44,44' of the powder dispensing device 32 is servocontrolled on the measurements performed by the weighing sensor 68,68' on which this tank is mounted, notably to deposit beads of powder discontinuously or in a localized manner on the working plane 18 or on a working zone 20 of the machine.

The invention claimed is:

1. A powder bed deposition additive manufacturing machine comprising:
    a manufacturing enclosure comprising a working plane comprising a working zone, the working zone defined by a manufacturing sleeve extending vertically under the working plane and a manufacturing plate sliding vertically inside the manufacturing sleeve, allowing an overlay of different powder layers to be received;
    a main powder tank positioned outside the manufacturing enclosure;
    a powder dispensing device positioned inside the manufacturing enclosure;
    a powder spreading device positioned inside the manufacturing enclosure; and
    a beam emitted by a source and making it possible to selectively fuse a layer of additive manufacturing powder spread over the working zone,
    wherein the powder dispensing device comprises
        a powder intake extending from the main powder tank into the manufacturing enclosure allowing powder to be delivered on top of the working plane,
        a mobile powder tank that is movably mounted above the working plane and that can be displaced to under the powder intake so as to be filled with powder, a bottom part of the mobile powder tank comprising a powder dispensing point,
            wherein a top part of the mobile powder tank comprises a supply aperture allowing the mobile powder tank to be supplied with powder from the powder intake, the top part of the mobile powder tank comprises a lateral wall, and the supply aperture is provided in the lateral wall, and
        a control device controlling the flow of powder via the powder dispensing point during a displacement of the mobile powder tank,
    wherein the mobile powder tank is mounted on a weighing sensor, and
    wherein the powder spreading device is in a form of a scraper or a roller mounted on a carriage, and
    wherein the carriage is mounted to move in a longitudinal direction, and the mobile powder tank is mounted to move by translation in a transverse direction perpendicular to the longitudinal direction along the carriage of the powder spreading device.

2. The powder bed deposition additive manufacturing machine according to claim 1, wherein the weighing sensor is a strain measurement gauge weighing sensor.

3. The powder bed deposition additive manufacturing machine according to claim 1, wherein a nozzle comprising the powder dispensing point is removably mounted under the bottom part of the mobile powder tank, and comprises an aperture forming the powder dispensing point, the aperture being situated at the lowest end of the nozzle.

4. The powder bed deposition additive manufacturing machine according to claim 3, wherein the nozzle has a hollow internal section, and the hollow internal section reduces progressively toward the powder dispensing point.

5. The powder bed deposition additive manufacturing machine according to claim 1, wherein the control device comprises a vibrator fixed to the mobile powder tank.

6. The powder bed deposition additive manufacturing machine according to claim 1, wherein the control device comprises a movable shutter, the shutter making it possible to prevent the powder from flowing through the powder dispensing point when the shutter is in a closed position, and the shutter allowing the powder to flow through the powder dispensing point when the shutter is in an open position, and
wherein the shutter is in a form of a flap valve mounted at an end of a rod mounted to move by translation inside the mobile powder tank.

7. The powder bed deposition additive manufacturing machine according to claim 6, wherein, when the shutter is in the open position, the flap valve is in a high position and not in contact with the bottom part of the mobile powder tank, and
wherein, when the shutter is in the closed position, the flap valve is in a low position and is in contact with the bottom part of the mobile powder tank.

8. The powder bed deposition additive manufacturing machine according to claim 1, wherein the mobile powder tank can be displaced in translation on a front face and on a rear face of the carriage.

9. The powder bed deposition additive manufacturing machine according to claim 1, wherein the powder dispensing device comprises a contactless measurement device for measuring a profile of the powder deposited on the working plane or on the working zone.

10. The powder bed deposition additive manufacturing machine according to claim 1, wherein the powder dispensing device comprises several powder intakes.

11. The powder bed deposition additive manufacturing machine according to claim 1, wherein the powder dispensing device comprises several mobile powder tanks that are movably mounted above the working plane and that can be displaced to under the powder intake so as to be filled with powder.

12. An additive manufacturing method implemented by the powder bed deposition additive manufacturing machine according to claim 1, the method comprising the step:
servocontrolling displacement of the mobile powder tank using measurements performed by the weighing sensor.

13. The additive manufacturing method according to claim 12, wherein a speed of displacement of the mobile powder tank is servocontrolled using the measurements performed by the weighing sensor.

14. The additive manufacturing method according to claim 12, wherein operation of the control device is servocontrolled using the measurements performed by the weighing sensor.

* * * * *